United States Patent

Konrad et al.

[11] 4,288,266
[45] Sep. 8, 1981

[54] METHOD FOR HEATED TOOL BUTT WELDING OF TUBE AND PIPE OF THERMOPLASTIC MATERIALS

[75] Inventors: Klaus-Dieter Konrad, Oberhausen; Rudolf Kellersohn, Hamminkeln; Hans Steck; Josef Schaub, both of Oberhausen, all of Fed. Rep. of Germany

[73] Assignee: Ruhrchemie Aktiengesellschaft, Oberhausen, Fed. Rep. of Germany

[21] Appl. No.: 55,879

[22] Filed: Jul. 9, 1979

[30] Foreign Application Priority Data

Jul. 13, 1978 [DE] Fed. Rep. of Germany ....... 2830722

[51] Int. Cl.³ ............................................. B65H 69/00
[52] U.S. Cl. ................................ 156/158; 156/304.2; 156/304.5; 156/304.6
[58] Field of Search ............... 156/304, 158, 544, 546, 156/323, 322, 155, 156, 502, 503, 296, 304.1, 304.2, 304.6, 304.5; 264/262, 263, 313, 314, 218, 248

[56] References Cited

U.S. PATENT DOCUMENTS 3,013,925 12/1961 Larsen ................................ 264/322
3,022,209 2/1962 Campbell .......................... 156/158

FOREIGN PATENT DOCUMENTS 197709 9/1977 U.S.S.R. ............................. 156/158

*Primary Examiner*—Michael W. Ball
*Attorney, Agent, or Firm*—Sprung, Felfe, Horn, Lynch & Kramer

[57] ABSTRACT

In a method for heated tool butt welding of pipe consisting of a thermoplastic material by placing or pressing the surfaces to be joined of the pipes to be welded into contact with a heated tool to form an inner weld bead at each end to be joined, subsequently heating the surfaces at a reduced contact pressure to the welding temperature and fitting the surfaces together under pressure after having removed the heated tool, the improvement for minimizing the formation of a protrusion within the resultant pipes which comprises pressing an elastic insert against the inner weld bead while joining said surfaces of said pipe together.

5 Claims, 5 Drawing Figures

METHOD FOR HEATED TOOL BUTT WELDING OF TUBE AND PIPE OF THERMOPLASTIC MATERIALS

BACKGROUND OF THE INVENTION

1. Field of the Invention

The invention relates to a method for heated tool butt welding of pipe and tube of thermoplastic materials which are used above all for waste water, fresh water, milk, beer, etc., for the transportation of solids and for the protection or for cooling electrical cables.

2. Discussion of the Prior Art

The heated tool butt welding is the dominant method of joining polyethylene and polypropylene pipe which is chiefly used for the purposes mentioned above (Plastverarbeiter, 1977, page 642). Welding of pipe of thermoplastic materials is effected by methods which are prescribed in instructions (e.g., in specification Deutscher Verband für Schweisstechnik No. 22 07 for rigid polyethylene, welding instructions for laymen).

For heated tool butt welding, the joint surfaces of the parts to be welded are placed into contact without or with pressure, thereafter heated to the welding temperature with reduced pressure and fitted together after removal of the heated tool.

The heating element or tool usually consists of an electrically heated metal disk. After having been heated to the welding temperature, the heated tool is placed between the parts to be welded, and the surfaces to be joined are pressed against the heated tool on both sides. The contact pressure is maintained until the surfaces to be joined are in complete engagement with the heated tool. At this time, a bead is present throughout the circumference of the parts to be welded. During the heating time which now follows, the contact pressure is reduced to a pressure in the range of 0.2 to 0.5 bars. After heating which requires about 30 to 250 seconds depending upon the wall thickness of the pipe, the surfaces to be joined are removed from the heated tool. When removing the heated tool, care is taken that the surfaces to be joined are not damaged or contaminated. The surfaces to be joined are fitted together immediately after having removed the heated tool.

The pressure set for making the joint is increased according to Specification DVS No. 22 07 and maintained. It is maintained until the weld has cooled. Unclamping can be effected only after cooling. The bead which is formed in welding has the appearance shown in FIG. 1 if the weld joint was made satisfactorily.

The inner bead which is necessarily formed with this mode of operation is regarded as disturbing. It increases the pressure loss, promotes deposits of solids, hinders the drawing-in of cables into protective pipe, represents an abrasive point for cables having been drawn in, etc.

Subsequent mechanical removal of the inner bead involves a considerable expense and is hardly possible in case of pipe lines of greater length due to their out-of-round.

It is an object of this invention, therefore, to provide a process for welding together by butt welding ends of thermoplastic pipe wherein, during the butt welding operation, the inner bead that is formed is flattened in such a manner that, on the one hand, the disadvantages mentioned above and encountered in the case of a pronounced inner bead are avoided but that, on the other hand, the strength properties of the weld joint are not impaired.

SUMMARY OF THE INVENTION

This invention contemplates an improvement in a method for heated tool butt welding of pipes made of a thermoplastic material by placing or pressing the surfaces to be joined of the pipes to be welded into contact with a heated tool, subsequently heating the surfaces to the welding temperature at a reduced contact pressure thereby forming an inner weld bead at each end to be joined and fitting the surfaces together under pressure after having removed the heated tool. This improvement comprises pressing an elastic insert or backing against the inner weld bead when making the joint.

BRIEF DESCRIPTION OF DRAWINGS

The invention can be more readily understood and appreciated when reference is made to the accompanying drawings in which.

DESCRIPTION OF SPECIFIC EMBODIMENT

After having heated and fluxed the pipe parts to be welded together, the heated tool is removed and the pipe ends are fitted together in the presence of an elastic insert which engages the inner surfaces of the two pipes to be joined at their ends. The ends are pressed together as usual and welded together, such as by applying additional heat to fuse the ends together.

Figure 2:
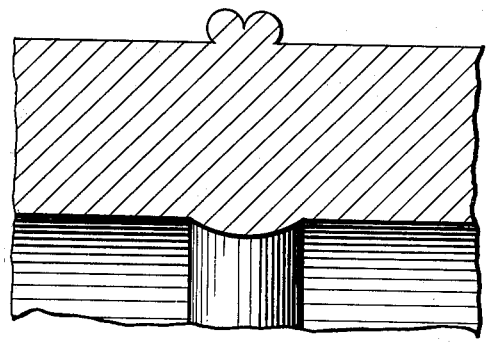
FIG. 2 is a view similar to FIG. 1 showing a partial longitudinal sectional view of thermoplastic pipe joined together by the process of the invention. Instead of forming a di-lobal bead within the pipe, a similar reinforcing bead of convex shape, for instance, is formed. Of course, depending on the degree of elasticity of the inserted elastic material, the pipe can be smooth or relatively smooth on the interior thereof.
Figure 3:
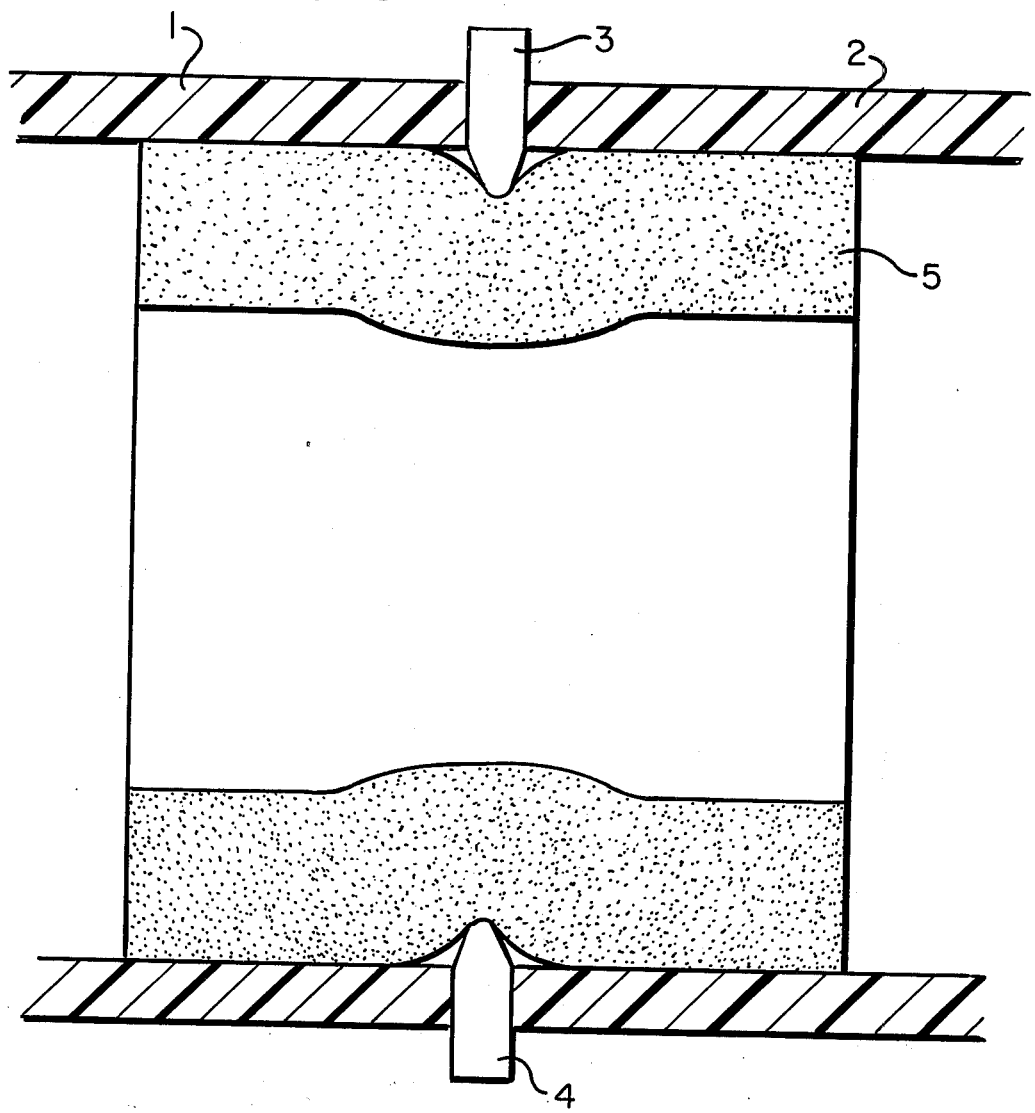
FIG. 3 shows a longitudinal sectional view of the polyethylene pipes 1 and 2 to be welded instead of being heated by separated elements 3 and 4 of the heated tool, 5 pictures the elastic insert, which is shaped by the inner edge of the heating tools.
Figure 5A:
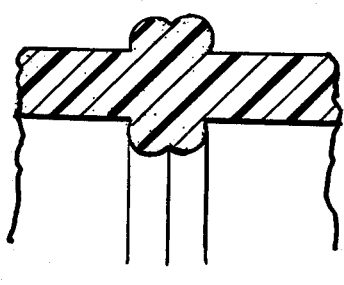
FIG. 5 shows different forms of beads. Drawing 5a shows the form of the bead according to specification DDS No. 2207.
FIG. 5b shows the bead usually obtained in practice and FIG. 5c shows the bead resulting from the process of the invention.
Figure 5B:
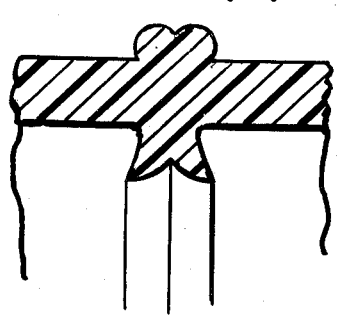
Figure 5C:
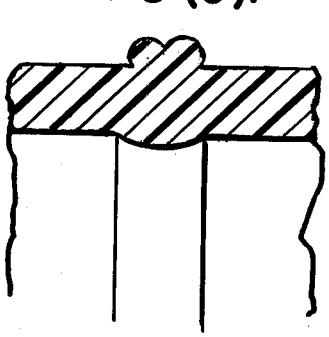
Figure 4:
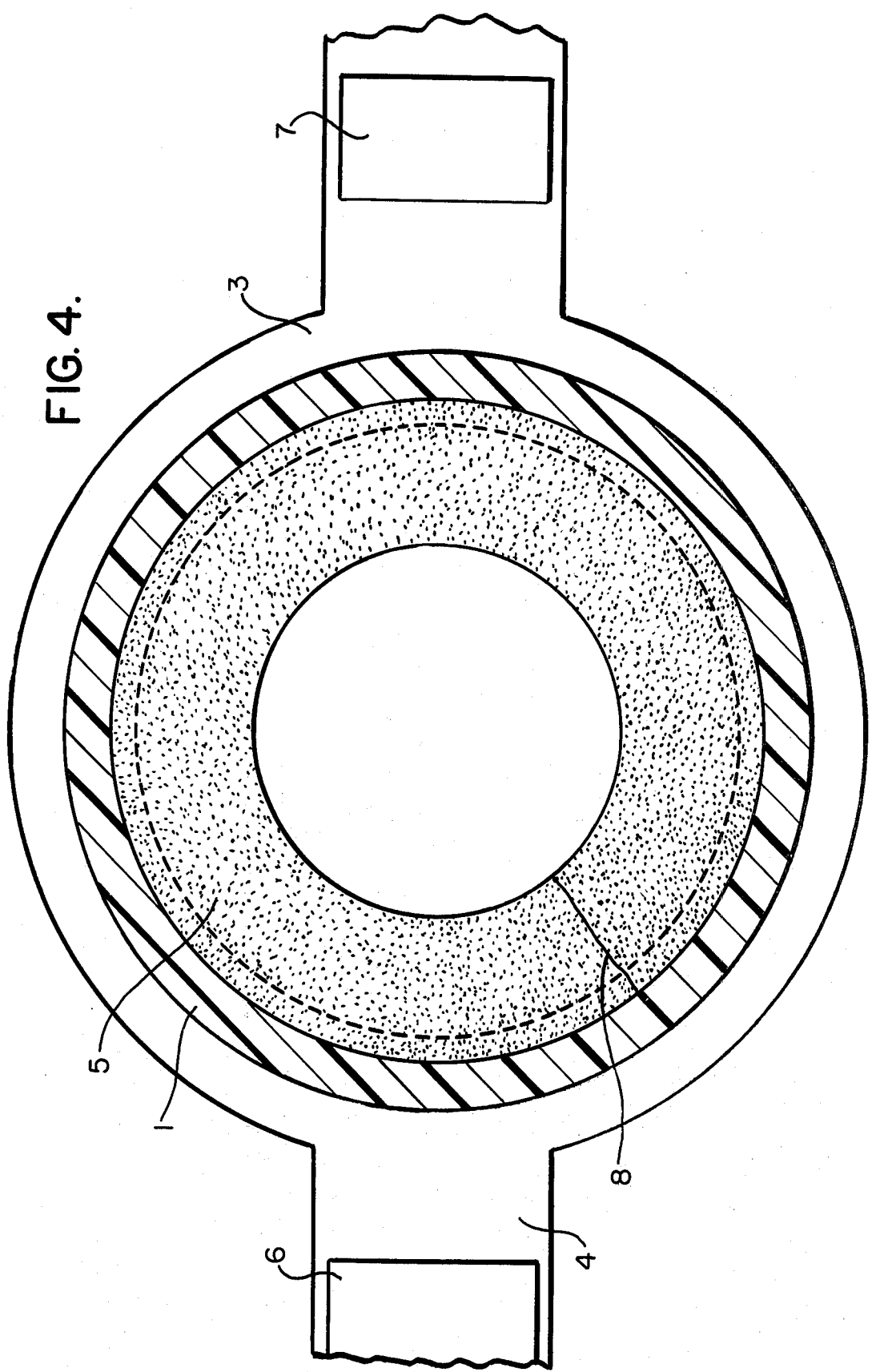
FIG. 4 shows a cross-sectional view of the polyethylene pipe 1, with the elastic insert. Behind the cross-section the separated elements 3 and 4 of the heated tool are presented. 6 and 7 represent the electric connections. 8 shows the pre-set breaking spot.

While the outer bead is formed as usual, the inner bead is flattened by means of the elastic insert disposed within the pipe and has the appearance shown in FIG. 2. The flat inner bead formed in this manner does not impair the strength properties of the weld seam as compared with the conventional freely formed inner bead. The inner bead may be impressed into a more or less flat shape depending upon the elasticity of the insert or backing and shape of the heating tool which is preferably one which is divided. The inner bead having been impressed into the flat shape must have an extent such that it is capable of accommodating the oxidation layers having been formed at the faces to be welded together prior to welding.

The heating tool for welding the ends together is usually heated electrically. However, heating with steam or a heating liquid is also possible.

The shape of the inner bead can be predetermined in a directive manner by preshaping the elastic insert or backing in the region where the inner bead is to be formed or by the action of the annular heating tool formed so that the inner bead on fitting together is impressed in accordance with this shape.

It is expedient for a simple and efficient mode of operation to place the elastic insert into the pipes to be welded before the pipe ends are placed and pressed into contact at the weld joint so that it constantly remains at the joint during heating and fitting together. To this end, the heating tool must be divisible to be removable from the welding position.

In order that the insert or backing can be readily inserted to the welding position and, after termination of the welding operation, pulled out of the pipe in as simple a manner as is possible, it is advantageous to provide the elastic insert or backing with a disconnecting cut or a preset breaking point before placing it into the pipes. The insert may also be given the form of an inflatable tube which is deflated after the welding operation and may then also be readily withdrawn from the pipe.

Moss rubber which is coated with a smooth butyl rubber layer at the side facing the weld is expediently used as the elastic insert. To avoid sticking of the heating tool to the pipe, it is advantageous to coat the heating tool with polytetrafluoroethylene.

The method according to the invention is particularly suited for welding polyethylene and polypropylene pipes.

To test the strength and tensile properties, elements were cut out from the welded pipes transversely with respect to the weld seam and subjected to the tensile test for determining their strength. All test specimens where the inner bead had been pressed flat according to the new mode of operation had the same strength as the normal non-welded pipe wall.

Figure 1:
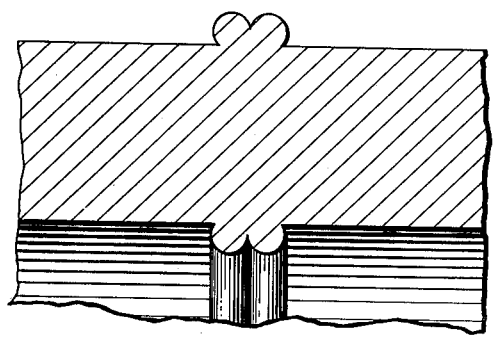
FIG. 1 is a partial longitudinal sectional view of pipes of thermoplastic material which have been joined together by the prior art procedure resulting in the formation of a di-lobal bead within the pipe, the lobes facing downwardly in FIG. 1. The entire longitudinal section of the joined pipe has not been illustrated.

The method can be used in all fields of use of thermoplastic pipe, e.g., for sewer pipe (for waste water) and fresh water pipe, conveyor pipes (for brine, solids which can be slurried, etc.), underwater pipelines (for waste water, fresh water, with communication cables, with energy cables), cable protection pipes, cable systems with forced cooling. The elastic insert material is introduced through the interior of the pipe and aligned with the joint to be formed. This elastic insert bears against the molten ends of the thermoplastic pipe to, in effect, prevent the formation of a di-lobal bead, as shown in FIG. 1. The same becomes flattened to assume the shape shown in FIG. 2.

"At reduced contact pressure" in claim 1, line 8 means, that the pressure, under which the surfaces of the pipes to be welded are pressed against the heated tool in order to be heated, is lower than the pressure under which the surfaces are fitted together after having removed the heated tool.

The elastic insert or backing with a disconnecting cut or preset breaking point (page 7, lines 1 and 2) is an elastic insert which can be readily fragmented into parts either by disconnecting or breaking so that the same can be easily removed from within the pipe, such as by passing air under pressure through the pipe.

What is claimed is:

1. A process of forming a weld between abutting ends of thermoplastic pipes to be joined which comprises:
    (a) disposing at the point of abutment of said pipes and within said pipes and inwardly deformable elastic insert;
    (b) disposing between the ends of said thermoplastic pipe a heated tool such that the ends of said thermopastic pipe abut said heated tool;
    (c) heated tool projecting into said inwardly deformable elastic insert to inwardly deform and shape the same and to dispose a portion of said elastic insert away from the point of the weld to thereby reduce the pressure on the inside of said pipe at the point of the weld;
    (d) heating said ends by contact with said heated tool to a temperature sufficient to weld their respective ends to one another;
    (e) withdrawing said heated tool and fitting said respective ends to one another, whereby said elastic insert bears against and flattens a bead which forms at said weld; and
    (f) cooling the pipes while said elastic insert bears against the walls of said thermoplastic pipe at the weld.

2. A method according to claim 1 wherein the elastic insert is placed into the pipes to be welded together prior to placing or pressing said insert into contact with the pipes to be joined at the position of the joint and constantly remains at the position of the joint during heating and fitting together and a divided tool having an annular shape is employed to weld said surfaces together.

3. A method according to claim 1 wherein an elastic insert having a disconnecting cut or a preset breaking point is used.

4. A method according to claim 1 wherein said elastic insert comprises moss rubber which is coated with a smooth butyl rubber layer on the side facing the weld joint.

5. A method according to claim 1 wherein a heating tool is employed to weld said surfaces together and said heating tool is coated with polytetrafluoroethylene.

* * * * *